(12) United States Patent
Cho

(10) Patent No.: US 6,357,727 B1
(45) Date of Patent: Mar. 19, 2002

(54) OZONIZED WATER GENERATING APPARATUS

(75) Inventor: Soo Hwan Cho, Seoul (KR)

(73) Assignee: Dong Woo Tech Co., Ltd., Ansung-koon (KR)

( * ) Notice: Subject to any disclaimer, the term of this patent is extended or adjusted under 35 U.S.C. 154(b) by 0 days.

(21) Appl. No.: 09/675,646

(22) Filed: Sep. 29, 2000

(30) Foreign Application Priority Data

Jun. 22, 2000 (KR) .............................. 00-17767

(51) Int. Cl.[7] .................................................. B01F 3/04
(52) U.S. Cl. ..................... 261/66; 261/76; 261/DIG. 75
(58) Field of Search ............................ 261/76, 77, 66, 261/DIG. 75; 210/198.1, 220, 221.2, 760

(56) References Cited

U.S. PATENT DOCUMENTS

| | | | | |
|---|---|---|---|---|
| 2,899,971 A | * | 8/1959 | Munter | 261/76 |
| 4,382,044 A | * | 5/1983 | Baumgartner et al. | 261/76 |
| 4,562,014 A | * | 12/1985 | Johnson | 261/76 |
| 5,186,841 A | * | 2/1993 | Schick | 261/76 |
| 5,948,324 A | * | 9/1999 | Cook | 261/66 |
| 5,951,921 A | * | 9/1999 | Koganezawa et al. | 261/76 |
| 6,086,833 A | * | 7/2000 | Conners et al. | 422/292 |

* cited by examiner

Primary Examiner—C. Scott Bushey
(74) Attorney, Agent, or Firm—Jacobson Holman, PLLC

(57) ABSTRACT

An ozonized water generating apparatus capable of changing the passage of a solenoid valve controlling water inflow to have a configuration where the water supplied to the solenoid valve can be accelerated, whereby the passage for mixing and controlling the water and ozone is configured in a simple manner and thereby, the number of component parts is reduced, such that the ozonized water generating apparatus can ensure the improved results in the product package, the production cost, the operation efficiency and the like. The ozonized water generating apparatus includes: an ejector installed in the inner wall of a fluid outlet of a solenoid valve and having a nozzle for accelerating the water supplied by the water pressure to eject the accelerated water to the passage of an ozone block; the fluid outlet of the solenoid valve having a chamber in which an ozonized air is sucked and mixed; a suction port formed in the chamber, for guiding the suction of the ozonized water; and an air filter installed on an air suction port for sucking an external air to an ozone generator of the ozone block.

3 Claims, 2 Drawing Sheets

OZONIZED WATER GENERATING APPARATUS

BACKGROUND OF THE INVENTION

1. Field of the Invention

The present invention relates to an ozonized water generating apparatus and more particularly, to an ozonized water generating apparatus capable of changing the passage of a solenoid valve controlling water inflow to have a configuration where the water supplied to the solenoid valve can be accelerated, whereby the passage for mixing and controlling the water and ozone is configured in a simple manner and thereby, the number of component parts is reduced, such that the ozonized water generating apparatus can ensure the improved results in the product package, the production cost, the operation efficiency and the like.

2. Description of the Related Art

An ozonized water is produced by mixing ozone to water and generally used for the purpose of water reclamation or provisional water-purification, thereby achieving sterilization and deodorization effects. A mechanically ozonized water generating method does not need a stand-by time required for evaporating residual materials and exhibits an excellent effect in the oxidization process of non-decomposition materials and heavy metals, when compared with chlorine disinfection used as a chemical process method. The principle parts of the general ozonized water generating apparatus are shown in FIG. 1.

In construction, the general ozonized water generating apparatus includes: an air pump 1 for sucking an external air to forcedly deliver the external air; an ozone block 3 having an ozone generator 2 for changing oxygen out of the air delivered through the air pump 1 into ozone; an ejector 4 for mixing the ozone through the ozone block 3 to the water supplied; a solenoid valve 7 installed between a water supply line 6 and the ejector 4, for controlling the water current supplied to the ejector 4 from a water source 5; a connecting pipe 8 for connecting the ejector 4 and the solenoid valve 7; and a nozzle 9 formed in the ejector 4.

The arrangement of the parts of the general ozonized water generating apparatus is varied depending upon the design method of the passages formed in the solenoid valve 7 and the ozone block 3 on the basis of the water supply line 6. The arrangement manner shown in FIG. 1 is a directly connected passage type.

In operation, briefly, the air pump 1 is driven to forcedly deliver the external air to the ozone generator 2, in which the oxygen in the external air is changed into the ozone. The changed ozone is decomposed to the oxygen, but most of the ozone that has not been decomposed is passed through a hose 10 that is silicon-processed and then ejected by the ejector 4. Next, the ejected ozone flows downstream of the solenoid valve 7 and is mixed and dissolved to the water discharged, thereby being finally discharged as the ozonized water.

The ejector 4 in the ozonized water generating apparatus functions to suck the ozone flowing at a relatively low pressure along the hose 10 by a high pressure of kinetic energy produced by the water pressure to mix the sucked ozone to the water, thereby ejecting the mixed result or functions to convey the fluid and mix the water and ozone.

Therefore, the ejector 4 plays an important role in forming the ozone concentration indicating the mixing state of the water and ozone.

The ejector 4 includes a suction port 11 into which the hose 10 through which the ozone flows is inserted, a nozzle 9 for a high pressure injection at the water inlet side thereof, and an extensive chamber 12 where the water having a high pressure of kinetic energy after passing the nozzle 9 and the ozone are met. The nozzle 9 is coupled to the solenoid valve 7 through the connecting pipe 8 and the chamber 12 is coupled to the ozone block 3, such that in the water supply process flowing along the water supply line 6 the ejector 4 can function to suck the ozone and mix the ozone and water in a stable manner.

The layout of the ejector 4 designed to be disposed on the water supply line 6 is dependent upon the solenoid valve 7. In other words, the fluid outlet 14 disposed in the opposite direction to the fluid inlet 13 of the solenoid valve 7 has an arbitrary passage length "L" and is coupled with the ejector 4 at the end side thereof through the connecting pipe 8. Based upon the above installation of the solenoid valve 7, the ejector 4 is coupled through the connecting pipe 8 with the fluid outlet 14 of the solenoid valve 7, while being separated by a predetermined interval from the center of the solenoid valve 7 by the formation of the passage length "L" of the water outlet 14.

The solenoid valve 7 and the ejector 4 are separately formed from each other and when they are assembled on the water supply line 6, the solenoid valve 7 is turned on/off by an electrical signal to thereby open and close the passages of the fluid inlet 13 and the fluid outlet 14. If the water flows, the ejector 4 changes the water into a high pressure of water by means of the nozzle 9 and sucks the ozone in the chamber 12, thereby mixing the water and ozone.

The air pump 1 as a kind of conveying means sends the external air to the ozone generator 2 to thereby produce the ozonized air and then, sends the ozonized air to the suction port 11 of the ejector 4 via the hose 10, such that the ozonized air is mixed well with the water flowing from the nozzle 9 of the ejector 4.

Really, the sending of the ozonized air to the ozone generator 2 is carried out by means of the air pump 1 and the mixing of the water and ozone is carried out by means of the ejector 4. This is because the sufficient supply of the ozonized air is achieved in case of sending the ozonized air at a high pressure to the ejector 4, but there occur problems that an excessive supply is caused and the stability (in obtaining an ideal ozone concentration) is not really verified. If the water is ejected at a high pressure during the operation of a system, therefore, the natural flowing of the ozonized air to the ejector 4 can be kept, without having the air pump 1.

The mixing of the water and ozone is carried out by sucking the external air (the ozonized air) in a convection current state by a pressure difference formed in the ejection of water at the high pressure through the nozzle 9 of the ejector 4. Such the suction state of the ozonized air may improve the stability of the mixing of the water and ozone. Since the ideal ozonized water is not achieved only by the increment of an amount of the ozone, the mixing action of the ejector 4 is an important factor in generating the ideal ozonized water.

For the layout of the conventional ozonized water generating apparatus, the solenoid valve 7 should include the fluid outlet 14 extending therefrom, the ejector 4 should include an assembling end coupled to the ozone block 3 in addition to the end of the nozzle 7 extending therefrom, the connecting pipe 8 for connecting the solenoid valve 7 and the ejector 4 should be essentially required to form a sealing processed passage, and the air pump 1 for sending the ozone generated from the ozone generator 2 to the ejector 4 through the hose 10 should be required.

Therefore, the separate parts should be required in order to couple the solenoid valve 7 and the ejector 4 and several assembling processes should be carried out in order to couple the solenoid valve 7, the ejector 4 and the ozone block 3 along a common passage.

In the conventional ozonized water generating apparatus, even if the ejector coupled to the solenoid valve only serves to suck the ozone and mix the water and ozone, it is configured in a rather complicated manner and since the ejector is coupled to the solenoid valve through the connecting pipe, it is formed after a predetermined passage length of the fluid outlet of the solenoid valve is set. As a result, the conventional ozonized water generating apparatus is somewhat difficult to be arranged in a small area and fails to achieve a satisfied efficiency of the air pump.

SUMMARY OF THE INVENTION

It is, therefore, an object of the present invention to provide an ozonized water generating apparatus capable of designing a passage through which water and ozone are mixed and flow in a simple manner, such that the number of parts can be reduced and the assembling work capability can be improved.

It is another object of the present invention to provide an ozonized water generating apparatus capable of enabling the passage distance between a solenoid valve and an ozone block to be shortened, thereby achieving the freedom of arrangement design.

To attain these and other objects of the present invention, there is provided an ozonized water generating apparatus having an ozone block in which an ozone generator is installed, a solenoid valve coupled via a fluid outlet with the ozone block and coupled via a fluid inlet with a water source, for receiving the water supplied by water pressure and opening/closing the water passage, an ejector coupled with a hose providing an ozonized air to the water passing through the fluid outlet and for accelerating the water current to eject the accelerated water at the pre-step of the ozonized air inflow through the hose, and an air suction port for sucking an external air to supply the ozonized air to the ejector, the apparatus comprising: the ejector installed in the inner wall of the fluid outlet of the solenoid valve and having a nozzle for accelerating the water supplied by the water pressure to eject the accelerated water to the passage of the ozone block; the fluid outlet of the solenoid valve having a chamber in which the ozonized air is sucked and mixed; and a suction port formed in the chamber, for guiding the suction of the ozonized air.

If the ejector is directly installed on the passage of the solenoid valve opening/closing the passage of water, it can be integrated with the solenoid valve, thereby achieving some advantages that the construction thereof is made in a simple manner, the product is miniaturized, the number of parts is reduced, the assembling work is improved and the ozonized water is produced without having any air pump.

DETAILED DESCRIPTION OF THE PREFERRED EMBODIMENT

Now, an explanation of a construction of an ozonized water generating apparatus according to the present invention will be hereinafter discussed with reference to FIGS. 2 to 4.

Figure 1:
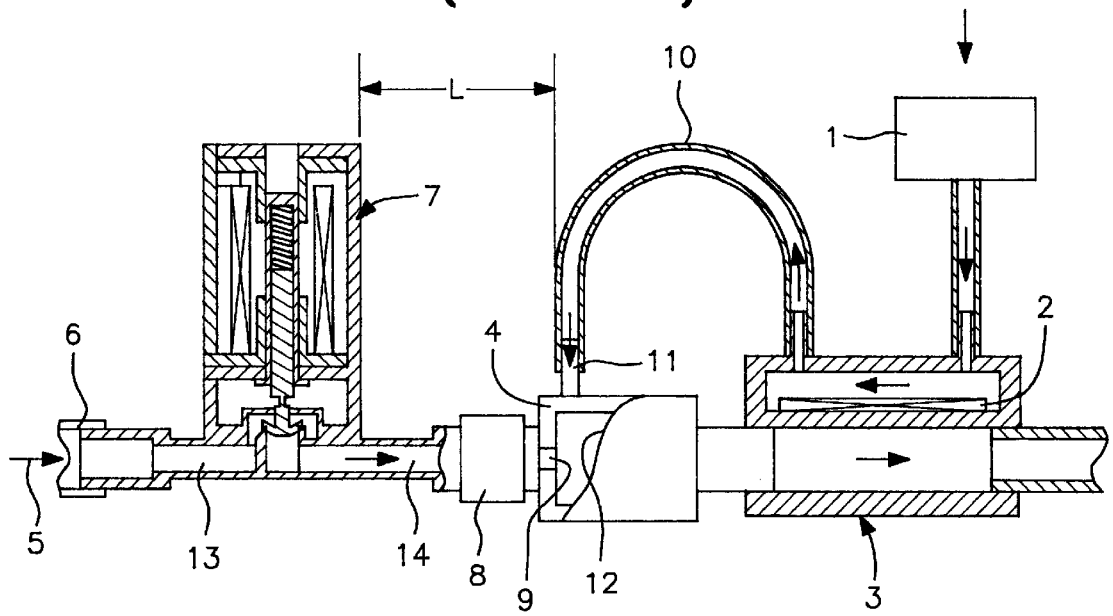
FIG. 1 is a sectional view illustrating the construction of a general ozonized water generating apparatus.
Figure 2:
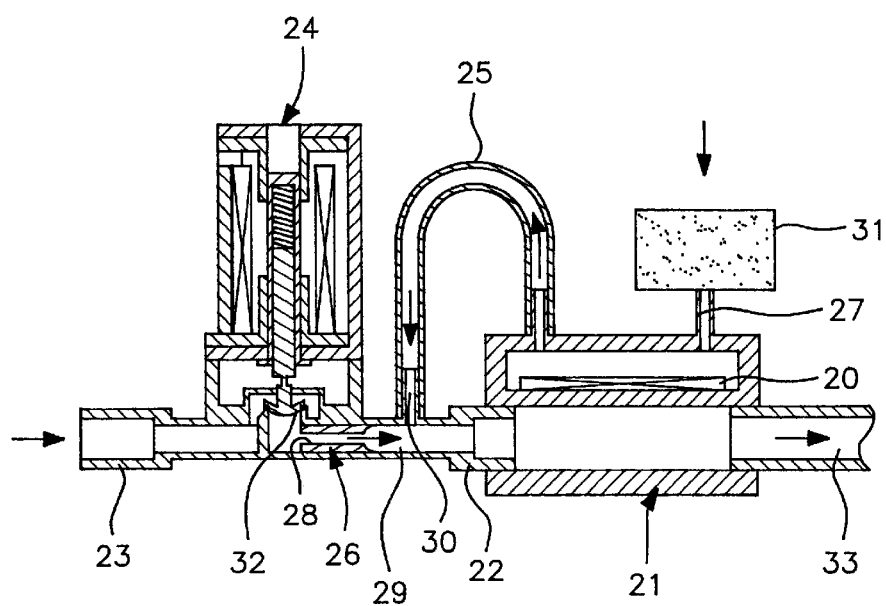
FIG. 2 is a sectional view illustrating the construction of an ozonized water generating apparatus according to the present invention.
Figure 3:
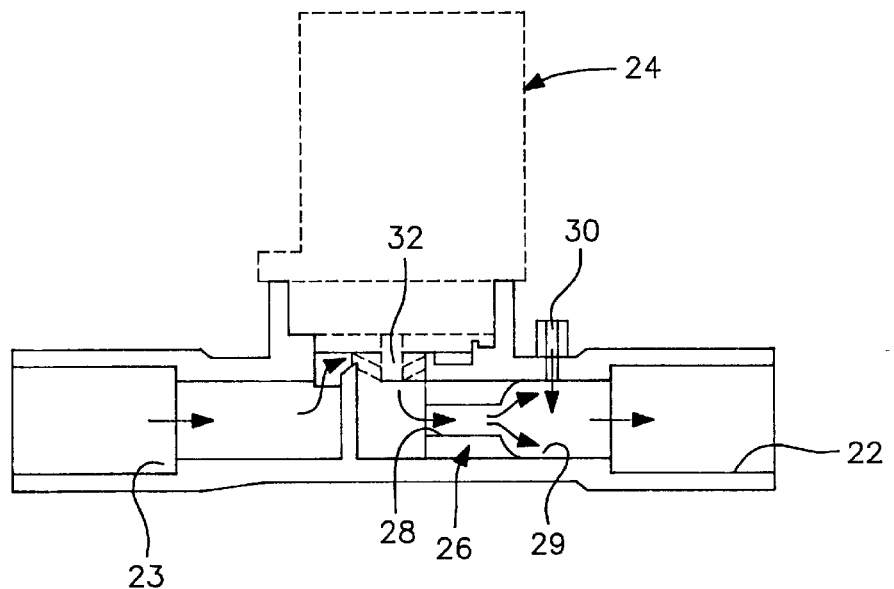
FIG. 3 is a sectional view illustrating the construction of an ejector-integrated type solenoid valve of FIG. 2.
Figure 4:
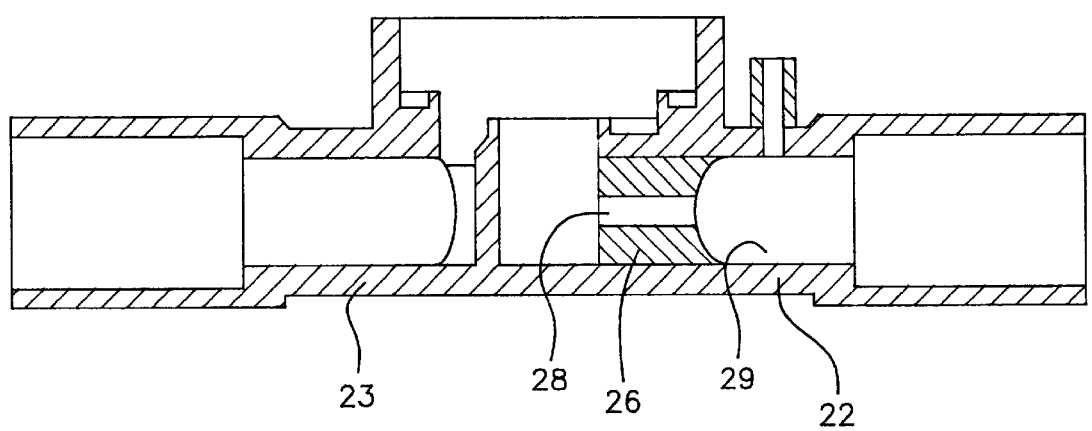
FIG. 4 is a sectional view illustrating the body of the solenoid valve of FIG. 2.

FIG. 2 is a sectional view illustrating the construction of an ozonized water generating apparatus according to the present invention, FIG. 3 is a sectional view illustrating the construction of an ejector-integrated type solenoid valve of FIG. 2, and FIG. 4 is a sectional view illustrating the body of the solenoid valve of FIG. 2.

As shown in FIG. 2, there is provided an ozonized water generating apparatus according to the present invention having an ozone block 21 in which an ozone generator 20 is installed, a solenoid valve 24 coupled via a fluid outlet 22 with the ozone block 21 and coupled via a fluid inlet 23 with a water source for receiving the water supplied by water pressure and opening/closing the water passage, an ejector 26 coupled with a hose 25 providing an ozone to the water passing through the fluid outlet 22 and for accelerating the water current to eject the accelerated water at the pre-step of the ozonized air inflow through the hose 25, and an air suction port 27 for sucking an external air to supply the ozonized water to the ejector 26, the apparatus which includes: the ejector 26 installed in the inner wall of the fluid outlet 22 of the solenoid valve 24 and having a nozzle 28 for accelerating the water supplied by the water pressure to eject the accelerated water to the passage of the ozone block 21; the fluid outlet 22 of the solenoid valve 24 having a chamber 29 in which the ozonized air is sucked and mixed; and a suction port 30 formed in the chamber 29, for guiding the suction of the ozonized air.

Further, the ozonized water generating apparatus according to the present invention comprises an air filter 31 on the air suction port 27 through which the external air flows to the ozone generator 20 of the ozone block 21.

The ejector 26 is disposed in the inner wall of the fluid outlet 22 of the solenoid valve 24 and is selectively formed as an integral body with the solenoid valve 24 or as a separately inserted body into the solenoid valve 24. Anyway, the ejector 26 is disposed in the inner wall of the fluid outlet 22 of the solenoid valve 24, with a consequence that the fluid outlet 22 is not extended.

If the ejector 26 is formed as the integral body with the fluid outlet 22 of the solenoid valve 24, the length of the passage does not further increase, such that the direct connection of the solenoid valve 24 and the ozone block 21 is allowed, thereby achieving the miniaturization of the system size.

In the ozonized water generating apparatus where the ozonized air is sucked and mixed with water to discharge the ozonized water, an explanation of the functions of the ejector 26 will be discussed in accordance with the opening/closing of the valve 32 of the solenoid valve 24.

If the solenoid valve 24 opens, the water flowing at a predetermined water pressure through the fluid inlet 23 of the solenoid valve 24 is induced to the inside thereof and moves at the predetermined water pressure to the fluid outlet 22 of the solenoid valve 24.

The pressure of water flowing to the fluid outlet 22 is the pressure of water provided at the water source. Then, the water, which has flow to the fluid outlet 22, raises the current speed, while passing through the nozzle 28 of the ejector 26 and is then ejected in the chamber 29.

At this time, the chamber 29 sucks the ozone gas generated via the hose 25 in the ozone block 21 with the air from the suction port 30, at the low pressure formed therein. The ozone gas flowing through the suction port 30 is collected in the interior of the chamber 29, and the suction action of the ozone gas and air is continuously generated whenever the water is passed through the nozzle 28 of the ejector 26. In this process, the water and ozone gas are mixed to produce the ozonized water, such that the produced ozonized water is discharged to a discharge port 33 through the passage of the ozone block 21. The mixing of the water and ozone gas is mostly carried out in the chamber 29.

If the solenoid valve 24 closes, the fluid inlet and outlet 22 and 23 are blocked by means of the valve 32 and thus, the water flowing to the fluid outlet 23 stops, thereby blocking the flowing of the water through the nozzle 28. At this time, the flowing of the ozone gas or air to the chamber 29 becomes at a stationary state, without having any directivity.

If the ozone generator 20 normally operates and the predetermined water pressure is kept, the opening state of the solenoid valve 24 is considered as the production process of the ozonized water. So as to send the ozone gas to the chamber 29 arranged in the fluid outlet 22 of the solenoid valve 24 through the suction port 30 in the production process of the ozonized water, air suction action has to be essentially carried out. In this case, the air functions as a means for carrying the ozone gas.

In case of mounting the air filter 31 on the air suction port 27 in the preferred embodiment of the present invention, the air filter 31 serves to filter the air sucked under a serious environmental polluted air condition, thereby preventing the ozonized water from being polluted due to the air sucked.

This is different from the forced air suction method by means of the air pump used in the conventional system. In more detail, the suction of air is carried out in accordance with the pressure difference of the air suction side, which does not need the air pump. If the air suction is carried out normally in the air suction side (if the amount of air for the supply of the appropriate amount of ozone gas required for the production of ozonized water is supplied), the ozonized water can be further cleaned by the filtering action of the air filter 31, without having any air pump.

In the present invention, in case where the air suction is carried out by the pressure difference in the chamber 29 obtained by the variation of the water current through the nozzle 28 of the ejector 26, there is a high possibility that the amount of air sucked is proportional to the current speed of the water.

The current speed of water and the mixing state of the water and ozone gas are important in achieving ideally ozonized water. In the present invention, if the shape, size and length of the suction port 30, the chamber 29 and the nozzle 28 are designed in consideration of the current speed of the water, various designs are mad e by increasing or decreasing the amount contained therein.

The forced air suction method has an advantage that the air is supplied via the ozone block 21 to the suction port 30 in a stable manner without having any variable. However, appropriate ozonized water is achieved not by the supply of a sufficient amount of ozone but by the mixing state of the ozone and water obtained by the supply of an appropriate amount of ozone. Moreover, in case where the fluid is not in a stationary state but in the changing state in amount and water pressure thereof there is a possibility that the ozone gas overflows when compared with the amount of water, thereby causing the instability of the system.

In the present invention even if the absolute stability for the supply of ozone gas can not be kept when compared with the forced air suction method used in the conventional system, the supply of ozone gas which is variable in accordance with the change of at least water pressure can be achieved.

In the ozonized water generating process, really, a large amount of ozone gas is dissolved and disappears during a thermal action or mixing. Even if the large amount of ozone gas is momentarily supplied in the water, it can not be immediately changed into the ozonized water and when a considerable mixing time is consumed in accordance with a proper ratio of the ozone gas to the water, changed into the ozonized water in a stable manner.

Therefore, the ozonized water generating apparatus according to the present invention has a disadvantage that the large amount of ozone gas is not momentarily sent but an advantage that the stability in the mixing state of the water and ozone gas can be kept in accordance with the variation of the water pressure. Based upon such the stability, an appropriate amount of ozone gas supplied relative to a reference water pressure can be set and a passage design is made based upon the above set amount of ozone gas, thereby achieving an ideal design for a proper ozonized water generation.

As clearly discussed in the above, an ozonized water generating apparatus according to the present invention is capable of comprising an ejector formed as an integral body with the fluid outlet of a solenoid valve controlling the inflow of water, thereby providing some advantages that the system can be configured in a miniaturized size, there is no need to install the connecting member required when the ejector is separately installed, and the cleanliness of the ozonized water can be improved, while having no air pump required by the replacement of the forced air suction manner of the ozone gas or air.

In addition, the amount of ozone gas supplied is variable in accordance with the change of the water pressure, such that various system designs can be embodied thus to achieve an appropriate quality of ozonized water.

What is claimed is:

1. An ozonized water generating apparatus having an ozone block in which an ozone generator is installed, a solenoid valve coupled via a fluid outlet with said ozone block and coupled via a fluid inlet with a water source for receiving the water supplied by water pressure and opening/closing a water passage, an ejector coupled with a hose providing an ozonized air to the water passing through said fluid outlet and for accelerating the water current to eject the accelerated water before the ozonized air inflow through said hose, and an air suction port for sucking an external air to supply the ozonized air to said ejector, said apparatus comprising:

said ejector installed in an inner wall of said fluid outlet of said solenoid valve and having a nozzle for accelerating the water supplied by the water pressure to eject the accelerated water to a passage of said ozone block;

said fluid outlet of said solenoid valve having a chamber in which the ozonized air is sucked and mixed with the water; and a suction port formed in said chamber, for guiding the suction of the ozonized air.

2. The ozonized water generating apparatus of claim 1, wherein said fluid outlet of said solenoid valve is directly coupled to the passage of said ozone block.

3. The ozonized water generating apparatus of claim 1, further comprising an air filter on said air suction port for sucking the external air to said ozone generator of said ozone block.

* * * * *